US009049221B1

(12) United States Patent
Yen et al.

(10) Patent No.: US 9,049,221 B1
(45) Date of Patent: Jun. 2, 2015

(54) DETECTING SUSPICIOUS WEB TRAFFIC FROM AN ENTERPRISE NETWORK

(71) Applicant: EMC Corporation, Hopkinton, MA (US)

(72) Inventors: Ting-Fang Yen, Cambridge, MA (US); Alina Oprea, Arlington, MA (US); Kaan Onarlioglu, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 29 days.

(21) Appl. No.: 14/139,003

(22) Filed: Dec. 23, 2013

Related U.S. Application Data

(60) Provisional application No. 61/903,011, filed on Nov. 12, 2013.

(51) Int. Cl.
*H04L 29/06* (2006.01)
(52) U.S. Cl.
CPC ........ *H04L 63/1408* (2013.01); *H04L 63/0236* (2013.01)
(58) Field of Classification Search
CPC ................... H04L 63/1408; H04L 63/0236
USPC ........................................ 726/2, 12; 713/154
See application file for complete search history.

(56) References Cited

U.S. PATENT DOCUMENTS

| | | | |
|---|---|---|---|
| 8,495,726 B2 * | 7/2013 | Agarwal et al. | 726/13 |
| 2007/0180225 A1 * | 8/2007 | Schmidt | 713/152 |
| 2007/0261112 A1 * | 11/2007 | Todd et al. | 726/11 |
| 2009/0222907 A1 * | 9/2009 | Guichard | 726/17 |
| 2013/0124717 A1 * | 5/2013 | Stevens et al. | 709/224 |

OTHER PUBLICATIONS

U.S. Appl. No. 13/731,654, filed Dec. 31, 2012, titled: Time Sanitization of Network Logs from a Geographically Distributed Computer System.
U.S. Appl. No. 13/731,643, filed Dec. 31, 2012, titled: Framework for Mapping Network Addresses to Hosts in an Enterprise Network.
U.S. Appl. No. 13/731,635, filed Dec. 31, 2012, titled: Anomaly Sensor Framework for Detecting Advanced Persistent Threat Attacks.

(Continued)

*Primary Examiner* — Hadi Armouche
*Assistant Examiner* — Dao Ho
(74) *Attorney, Agent, or Firm* — Ryan, Mason & Lewis, LLP

(57) ABSTRACT

Methods, apparatus and articles of manufacture for detecting suspicious web traffic are provided herein. A method includes generating a database comprising information corresponding to each of multiple connections between one or more destinations external to an enterprise network and one or more hosts within the enterprise network, wherein said multiple connections occur over a given period of time; processing multiple additional connections between one or more destinations external to the enterprise network and one or more hosts within the enterprise network with one or more filtering operations to produce one or more filtered connections, wherein said multiple additional connections occur subsequent to said given period of time; and analyzing said filtered connections against the database to identify a connection to a destination external to the enterprise network that is not included in the information in the database.

15 Claims, 4 Drawing Sheets

(56) References Cited

OTHER PUBLICATIONS

Abu et al., A Multifaceted Approach to Understanding the Botnet Phenomenon. In ACM SIGCOMM Conf. Internet Measurement, 2006, pp. 1-12.
Antonakakis et al., Building a Dynamic Reputation System for DNS. In USENIX Security, 2010, pp. 1-17.
Antonakakis et al., Detecting Malware Domains at the Upper DNS Hierarchy. In USENIX Security, 2011, pp. 1-16.
Antonakakis et al., From Throw-away Traffic to Bots: Detecting the Rise of DGA-based Malware. In USENIX Security, 2012, pp. 1-16.
Bilge et al., Disclosure: Detecting Botnet Command and Control Servers Through Large-scale NetFlow Analysis. In ACSAC, 2012, pp. 1-10.
Bilge et al., Exposure: Finding Malicious Domains Using Passive DNS Analysis. In NDSS, 2011, pp. 1-17.
Binkley et al., An Algorithm for Anomaly-based Botnet Detection. In USENIX Wksp. Steps to Reducing Unwanted Traffic on the Internet, 2006, pp. 43-48.
Brauckhoff et al., Anomaly Extraction in Backbone Networks Using Association Rules. In ACM SIGCOMM Conf. Internet Measurement, 2009, pp. 1-7.
Chapple et al., Authentication Anomaly Detection: A Case Study on a Virtual Private Network. In ACM Wksp. Mining Network Data, 2007, pp. 1-6.
Choi et al., Botnet Detection by Monitoring Group Activities in DNS Traffic. In IEEE Intl. Conf. Computer and Information Technology, 2007, pp. 715-720.
Cooke et al., The Zombie Roundup: Understanding, Detecting, and Disrupting Botnets. In USENIX Wksp. Steps to Reducing Unwanted Traffic on the Internet, 2005, pp. 1-6.
Dewaele et al., Extracting Hidden Anomalies Using Sketch and non Gaussian Multi-resolution Statistical Detection Procedures. In ACM Wksp. Large Scale Attack Defense, 2007, pp. 1-8.
Francois et al., BotTrack: Tracking Botnets Using NetFlow and PageRank. In Intl. IFIP TC 6 Conf. Networking. Springer-Verlag, 2011, pp. 1-14.
Freiling et al., Botnet Tracking: Exploring a Root-cause Methodology to Prevent Distributed Denial-of-service Attacks. In European Conf. Research in Computer Security. Springer-Verlag, 2005, pp. 1-32.
Gu et al., BotMiner: Clustering Analysis of Network Traffic for Protocol- and Structure-independent Botnet Detection. In USENIX Security, 2008, pp. 139-154.
Gu et al., BotHunter: Detecting Malware Infection Through IDS-driven Dialog Correlation. In USENIX Security, 2007, pp. 1-16.
Gu et al., BotSniffer: Detecting Botnet Command and Control Channels in Network Traffic. In NDSS, 2008, pp. 1-18.
Holz et al., Measuring and Detecting Fast-Flux Service Networks. In NDSS, 2008, pp. 1-12.
John et al., Studying Spamming Botnets Using Botlab. In USENIX NSDI, 2009, pp. 1-15.
Jolliffe. Principal Component Analysis. Springer-Verlag, 1986, pp. 1-56.
Karasaridis et al., Wide-scale Botnet Detection and Characterization. In USENIX Wksp. Hot Topics in Understanding Botnets, 2007, pp. 1-8.
Levine et al., The Use of Honeynets to Detect Exploited Systems Across Large Enterprise Networks. In IEEE Wksp. Information Assurance, 2003, pp. 92-99.
Livadas et al., Using Machine Learning Techniques to Identify Botnet Traffic. In IEEE Conf. Local Computer Networks, 2006, pp. 1-6.
Ma et al., Beyond Blacklists: Learning to Detect Malicious Web Sites from Suspicious URLs. In ACM SIGKDD Intl. Conf. Knowledge Discovery and Data Mining, 2009, pp. 1-9.
Nazario et al., As the Net Churns: Fast-flux Botnet Observations. In Intl. Conf. on Malicious and Unwanted Software, 2008, pp. 1-9.
Passerini et al., FluXOR: Detecting and Monitoring Fast-Flux Service Networks. In Intl. Conf. Detection of Intrusions and Malware, and Vulnerability Assessment. Springer-Verlag, 2008, pp. 1-20.
Perdisci et al., Detecting Malicious Flux Service Networks through Passive Analysis of Recursive DNS Traces. In ACSAC, 2009, pp. 1-10.
Ramachandran et al., Understanding the Network-level Behavior of Spammers. In ACM Conf. on Applications, Technologies, Architectures, and Protocols for Computer Communications, 2006, pp. 1-12.
Sperotto et al., Anomaly Characterization in Flow-Based Traffic Time Series. In IEEE Intl. Wksp. IP Operations and Management. Springer-Verlag, 2008, pp. 1-13.
Stone-Gross et al., Your Botnet is My Botnet: Analysis of a Botnet Takeover. In ACM CCS, 2009, pp. 1-13.
Strayer et al., Detecting Botnets with Tight Command and Control. In IEEE Conf. Local Computer Networks, 2006, pp. 1-8.
Villamarin-Salomon et al., Bayesian Bot Detection Based on DNS Traffic Similarity. In ACM Symp. Applied Computing, 2009, pp. 2035-2041.
Wagner et al., Entropy Based Worm and Anomaly Detection in Fast IP Networks. In IEEE Intl. Wksp. Enabling Technologies: Infrastructure for Collaborative Enterprise, 2005, pp. 1-6.
Yadav et al., Detecting Algorithmically Generated Malicious Domain Names. In ACM SIGCOMM Conf. Internet Measurement, 2010, pp. 1-14.
Yadav et al., Winning With DNS Failures: Strategies for Faster Botnet Detection. In Intl. ICST Conf. Security and Privacy in Communication Networks, 2011, pp. 1-10.
Yen et al., Traffic Aggregation for Malware Detection. In Intl. Conf. Detection of Intrusions and Malware, and Vulnerability Assessment. Springer-Verlag, 2008, pp. 207-227.
Zhang et al., Safeguarding Academic Accounts and Resources with the University Credential Abuse Auditing System. In Intl. Conf. Dependable Systems and Networks. IEEE Computer Society, 2012, pp. 1-8.
Page et al., "The PageRank citation ranking: Bringing order to the web." 1998, pp. 1-17.
Rosvall et al., "Maps of random walks on complex networks reveal community structure," PNAS, vol. 105, No. 4, pp. 1118-1123, Jan. 29, 2008, pp. 1-62.
U.S. Appl. No. 14/139,047, filed Dec. 23, 2013, titled: Behavioral Detection of Suspicious Host Activities in an Enterprise.
U.S. Appl. No. 14/138,961, filed Dec. 23, 2013, titled: Identifying Suspicious User Logins in Enterprise Networks.
U.S. Appl. No. 14/139,019, filed Dec. 23, 2013, titled: Modeling User Working Time Using Authentication Events within an Enterprise Network.

* cited by examiner

DETECTING SUSPICIOUS WEB TRAFFIC FROM AN ENTERPRISE NETWORK

CROSS-REFERENCE TO RELATED APPLICATION

The present application claims priority to U.S. Provisional Patent Application Ser. No. 61/903,011, filed Nov. 12, 2013, entitled "A Method for Detecting Suspicious Web Traffic," incorporated by reference herein in its entirety.

FIELD

The field relates generally to information technology (IT), and more particularly to IT security within enterprises.

BACKGROUND

It is common for enterprises to monitor out-going network web traffic. Such out-going web connections are ideally largely enterprise-related (for example, communications with customers, affiliates, and partner sites), in support of system operations, or required by employees to perform corresponding job duties. In practice, however, a myriad of diverse activities are conducted within an enterprise over the hypertext transfer protocol (HTTP). A portion of such activities are commonly associated with benign user activities, such as web browsing and social media use, but it has also become increasingly common for malware and attackers to conduct suspect activities over HTTP in an attempt to blend into network activity and evade detection. Examples of such malicious communications can include malware contacting the remote attacker to provide stolen information from infected hosts, transferring status updates, and obtaining commands for execution.

In existing detection approaches, detecting malicious communications relies heavily on the use of signatures, wherein a signature specifies the exact domain name or internet protocol (IP) address to which known undesirable traffic is destined. Such approaches, however, are only applicable to known malware or attacks, and moreover, such approaches require considerable manual work, for example, to reverse malware binaries and identify the command-and-control server. Accordingly, a need exists for techniques to detect potentially malicious communications and the host responsible by examining the external destinations contacted from within an enterprise network.

SUMMARY

One or more illustrative embodiments of the present invention provide techniques for detecting suspicious web traffic from an enterprise network. In accordance with an aspect of the invention, a method is provided comprising the steps of: generating a database comprising information corresponding to each of multiple connections between one or more destinations external to an enterprise network and one or more hosts within the enterprise network, wherein said multiple connections occur over a given period of time; processing multiple additional connections between one or more destinations external to the enterprise network and one or more hosts within the enterprise network with one or more filtering operations to produce one or more filtered connections, wherein said multiple additional connections occur subsequent to said given period of time; and analyzing said one or more filtered connections against the database to identify, from the one or more filtered connections, a connection to a destination external to the enterprise network that is not included in the information in the database.

In accordance with another aspect of the invention, a method is provided comprising the steps of: examining, over a specified period of time, each of multiple connections between (i) one or more destinations external to an enterprise network and (ii) one or more hosts within the enterprise network; generating a database comprising information corresponding to each of said multiple connections; and processing multiple additional connections between (i) one or more destinations external to the enterprise network and (ii) one or more hosts within the enterprise network with one or more filtering operations to produce one or more filtered connections. The method also comprises the steps of: analyzing said one or more filtered connections against the database to identify, from the one or more filtered connections, a connection to a destination external to the enterprise network that is not included in the information in the database; and outputting an alert corresponding to said identified instance.

The techniques of the illustrative embodiments described herein overcome one or more of the problems associated with the conventional techniques described previously, and provide suspicious web traffic detection techniques. These and other features and advantages of the present invention will become more readily apparent from the accompanying drawings and the following detailed description.

DETAILED DESCRIPTION

As will be described herein, the present invention, in one or more illustrative embodiments, provides techniques for detecting suspicious web traffic from an enterprise network. At least one embodiment of the invention includes detecting potentially stealthy and/or malicious communications and the host responsible by examining the external destinations contacted from within an enterprise. Such information is commonly recorded in organizational networks, and can typically be found in sources such as, for example, web proxy logs and domain name system (DNS) logs.

As further detailed herein, at least one embodiment of the invention includes identifying hosts that communicate with new or obscure external destinations that are never (or rarely) contacted from within an enterprise. Assuming that popular websites are more effectively administered and less likely to be compromised, connections to uncommon destinations can be indicative of potentially suspicious behavior. For example, malware have been frequently observed to communicate with servers dedicated for the command-and-control channel. Accordingly, aspects of the invention, as described below, include identifying infected hosts and dynamically generated domains (frequently used by malware, for example, to evade being blacklisted), including such entities that may have been previously unknown to the enterprise's Security Operations Center (SOC).

Another challenge facing existing detection approaches includes the volume of outbound traffic collected from enterprises and the noise present in such data. For example, noise present in such data might include dealing with destinations that are already blocked by the enterprise, resolving IP addresses to domain names, and identifying instances wherein the external destination is contacted only by automated software, such as bookmark toolbars, and not actually visited by the internal host. Accordingly, as detailed herein, at least one embodiment of the invention includes efficiently reducing the amount of data that needs to be analyzed, and bridging the semantic gap between what is recorded in logs and the actual activities that took place.

Illustrative embodiments of the present invention will be described herein with reference to exemplary communication systems and associated processing devices. It is to be appreciated, however, that the invention is not restricted to use with the particular illustrative system and device configurations shown. Accordingly, a communication system or computing device, as used herein, is intended to be broadly construed so as to encompass any type of system in which multiple processing devices can communicate with one or more other devices.

Figure 1:
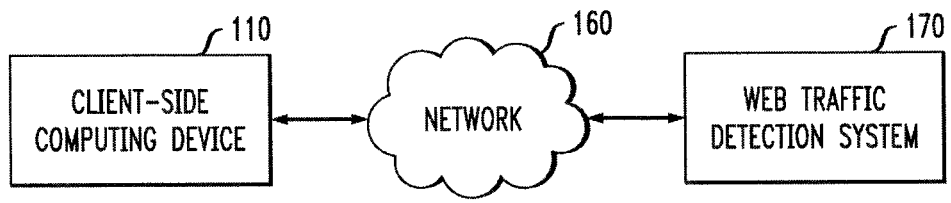
FIG. 1 is a diagram illustrating an example network environment in which one or more embodiments of the present invention can operate.

FIG. 1 illustrates an example client-side computing device (CSCD) 110 communicating with web traffic detection system 170 over a network 160. The network 160 can include, for example, a global computer network such as the Internet, a wide area network (WAN), a local area network (LAN), a satellite network, a telephone or cable network, or various portions or combinations of these and other types of networks.

In at least one embodiment of the invention, the CSCD 110 is a customer server which updates the web traffic detection system 170 with data. Accordingly, the CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, or any other information processing device which can benefit from the use of fraud detection techniques in accordance with the invention. It is to be appreciated that a given embodiment of the disclosed system may include multiple instances of CSCD 110 and possibly other system components, although only a single instance is shown in the simplified system diagram of FIG. 1 for clarity of illustration.

The CSCD 110 may also be referred to herein as simply a "user." The term "user," as used in this context, should be understood to encompass, by way of example and without limitation, a user device, a person (or employee, for example) utilizing or otherwise associated with the device, or a combination of both. An operation described herein as being performed by a user may therefore, for example, be performed by a user device, a person utilizing or otherwise associated with the device, or by a combination of both the person and the device. Similarly, information described as being associated with a user may, for example, be associated with a CSCD device 110, a person utilizing or otherwise associated with the device, or a combination of both the person and the device.

Figure 2:
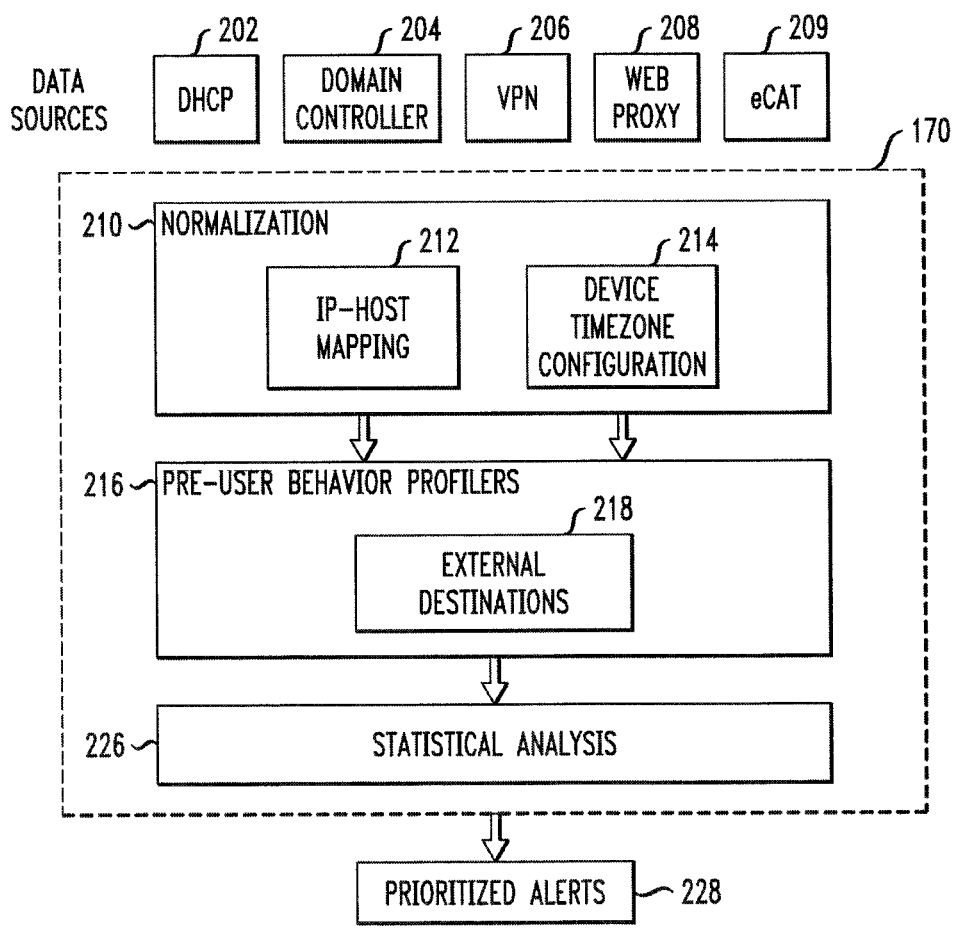
FIG. 2 is a block diagram illustrating example system components, according to an embodiment of the invention.

An exemplary web traffic detection system (such as system 170 in FIG. 1) is described in additional detail below in connection with FIG. 2. Accordingly, FIG. 2 is a block diagram illustrating example system components, according to an embodiment of the invention. As depicted in FIG. 2, the web traffic detection system 170 acts on data received from various sources. Such data sources can include, for example, dynamic host configuration protocol (DHCP) servers 202, domain controllers 204, virtual private networks (VPNs) 206, web proxies 208 and enterprise malware threat detection software (such as, for example, eCAT) 209. Such data sources, as detailed herein, are processed and analyzed by the web traffic detection system 170 to ultimately generate alerts 228.

As also depicted in FIG. 2, the web traffic detection system 170 includes three layers: (1) a normalization layer 210 that includes functionality to parse, filter, and normalize log data using network-specific configuration information; (2) a per-user behavior profiler layer 216 that processes normalized log data to produce web traffic data; and (3) a statistical analysis layer 226 that performs one or more analytical techniques on the user behavior data to identify outlying and/or suspicious activity, which the system 170 reports as incidents and/or prioritized alerts 228.

For example, as depicted in FIG. 2, the web traffic detection system 170 includes a normalization layer 210, wherein the timestamps of all log entries are normalized (for example, normalized to Coordinated Universal Time (UTC)) via device time zone configuration component 214. Additionally, the normalization layer 210 determines statically and dynamically assigned IP addresses of hosts, and constructs bindings between hosts and IP addresses via IP-host mapping component 212, thus attributing every logged event to a specific host.

Referring back to the normalization layer 210, the device time zone configuration component 214 leverages the common use by enterprises of a central SIEM system for log management that tags each log entry with its own timestamp $t_{siem}$, recording the time at which the log was received by the SIEM. For each device that sends logs to the SIEM system, at least one embodiment of the invention includes computing a set of time difference values $\Delta_i = t_{siem,i} - t_{device,i}$ (that can be, for example, rounded off to the nearest 30 minutes) from each log entry i generated over a time period (for example, one month). Additionally, such an embodiment includes determining the timestamp correction value $\Delta_{correction}$ for the device by setting the correction value to the value $\Delta_i$ that accounts for the majority of differences. Applying this correction value to each device timestamp produces a normalized timestamp value, $t_{normalized,i} = t_{device,i} + \Delta_{correction}$. By way merely of example, $t_{normalized,i}$ can be configured to correspond to UTC. Additional description of an exemplary normalization technique can be found, for example, in U.S. patent application Ser. No. 13/731,654, entitled "Time Sanitization of Network Logs from a Geographically Distributed Computer System," filed on Dec. 31, 2012, and incorporated by reference herein in its entirety. Accordingly, at least one embodiment of the invention includes applying the above normalization technique to each device on the network that produces log data, normalizing all log timestamps (for example, to UTC).

Additionally, as depicted in FIG. 2, the web traffic detection system 170 includes an IP-host mapping component 212 as a part of the normalization layer 210. The IP-host mapping component 212 analyzes DHCP server logs collected in the SIEM system and constructs a database of IP-to-host mappings (also referred to herein as bindings) over time. Each binding is represented as a tuple {IP address, hostname, media access control (MAC) address, start-time, end-time} mapping an IP address to a host in a specific time interval. The algorithm implemented to carry out the mapping can be run at intervals (for example, daily) to update existing bindings as new DHCP logs become available. Given the resulting database of bindings, at least one embodiment of the invention can identify the host corresponding to a given IP address with reference to a normalized timestamp. Additional description of an exemplary mapping technique can be found, for example, in U.S. patent application Ser. No. 13/731,643, entitled "Framework for Mapping Network Addresses to Hosts in an Enterprise Network," filed on Dec. 31, 2012, and incorporated by reference herein in its entirety.

Accordingly, an external destination analysis component 218 resident on the per-user behavior profiler layer 216 of system 170 includes identifying, based on the normalized data described above, hosts that communicate with new or obscure external destinations that are never (or rarely) contacted from within an enterprise, as well as dynamically generated domains. The functionality of the external destination analysis component 218 is discussed further below.

Referring back to FIG. 2, as depicted via statistical analysis layer 226 of temporal modeling system 170, at least one embodiment of the invention includes computing statistics pertaining to the popularity of a given destination (for example, the number of internal hosts that communicated with the given destination) to identify and filter out popular destinations (because such an embodiment of the invention includes an assumption that uncommon and/or obscure destinations are more likely to be suspicious than are common or popular destinations). After filtering out the popular destinations and folding the domains, such an embodiment of the invention can also include determining the age of a domain to further filter destinations (because such an embodiment also includes an assumption that suspicious destinations would be relatively young.) Such aspects of the invention are described in additional detail below.

As also detailed herein and depicted in FIG. 2, at least one embodiment of the invention includes generating incidents (also identified as prioritized alerts 228 in FIG. 2) and reporting the incidents to a security analyst. The incidents (or alerts) can include contextual information pertaining to certain web traffic data. Additionally, a graphical representation of the incidents generated over a given period of time (for example, in a particular day) can be displayed to an analyst.

As noted above, an aspect of the invention includes an external destination analysis component 218, which facilitates detection of suspicious web traffic within an enterprise network. Accordingly, at least one embodiment of the invention includes building a database or history of external destinations (that is, website domain names and/or IP addresses) contacted by internal hosts over time within an enterprise. After an initial bootstrapping period (for example, one month), a destination can be considered "new" if that destination has never been contacted by hosts in the enterprise before (and, as such, is not part of the history or database).

Additionally, such an embodiment of the invention can include updating the history and/or database per a given temporal interval or frequency (for example, on a daily basis) to include new destinations contacted in the previous temporal interval. For each destination, at least one embodiment of the invention includes storing the timestamp corresponding to each instance that the destination was contacted from a host within the enterprise. Further, at least one embodiment of the invention includes removing or expiring a destination from the database and/or history if the destination has not been contacted over a specified duration of time (for example, 90 days).

As noted herein, a challenge exists with respect to the volume of web traffic data associated with an enterprise network. Accordingly, an aspect of the invention includes employing one or more data reduction techniques to render processing scalable. Such data reduction techniques, as detailed below, can include custom white-listing, filtering, and domain folding.

In enterprise networks, it can commonly be observed that many popular websites are contacted by the vast majority of internal hosts, generating much traffic that can be filtered out in search for new and/or rare destinations. Accordingly, at least one embodiment of the invention includes creating a customized white-list of popular destinations for a given enterprise. Because different organizations may have different network traffic patterns, such embodiments of the invention define "popularity" over the hosts in the given enterprise. As a result, a customized white-list includes destinations (both domains and IP subnets, for example) whose number of interacting internal hosts (as learned over a specified training period) exceeds a given threshold. Specifically, in at least one embodiment of the invention, a white-list is customized for the enterprise network under study. More specifically, an external destination is included on such a white-list if that destination has been contacted by more than a certain number of internal hosts from that enterprise network, wherein the number of hosts is a configurable parameter.

Additionally, at least one embodiment of the invention includes counting the number of new destinations contacted by a host without a whitelisted HTTP referrer. Users are commonly directed to new sites by search engines, news sites, or advertisements. In such cases, it can be expected that the HTTP referrer is listed in a custom whitelist, such as described above. Accordingly, hosts that visit new sites without being referred by a reputable source (or with no referrer at all) can be considered suspicious.

In addition to custom white-listing, at least one embodiment of the invention includes folding destinations to the second-level sub-domain to filter services employing random strings as sub-domains, such as content delivery networks (CDNs) and cloud services. By way of example, the Domain Name System (DNS) has a hierarchical (tree) structure: each node in the tree is a domain, the root domain is referred to as the domain, and a child of the domain is referred to as a sub-domain (for example "google.com" is a sub-domain of ".com"). Nodes at the first level of the tree are referred to as top-level domains. When folding, at least one embodiment of the invention includes parsing the domain name in reverse order until a second-level sub-domain is obtained. For example, domain "news.bbc.co.uk" is folded to "bbc.co.uk" because both "co" and "uk" are top-level domains.

Also, with regards to data reduction, connections associated with bookmarks can be ignored in accordance with one or more embodiments of the invention. One or more embodiments of the invention can further include filtering out connections that retrieve a "favicon" image (which is a file containing the icon associated with a website), because those connections can be attributed to automated bookmark software and not necessarily to a visit by the user.

Additionally, at least one embodiment of the invention includes implementing one or more techniques to reduce noise in the relevant collection(s) of data. For example, many external destinations include raw IP address. Rather than performing a reverse DNS lookup for such destinations (which would return the corresponding domain name), at least one embodiment of the invention includes opting not to resolve raw IP addresses both due to performance reasons (a single lookup can take several seconds to complete, especially when the domain name is not found) and because many legitimate sites are referred to by their domain names. Raw IP destinations that are not on a white-list (such as described above) are hence considered to be new.

Further, at least one embodiment of the invention includes maintaining, within the database and/or history, only destinations with successful connections. Such an embodiment can ensure that the history or database maintains a clean baseline to which subsequent network activities can be compared. If a destination is blocked (for example, per an enterprise's network policies because the destination is known to be malicious), at least one embodiment of the invention can nonetheless include raising an alert for a host that contacts such a destination.

Another indication of potentially suspicious behavior is the age of a domain. Accordingly, one or more embodiments of the invention include determining domain age. In such embodiments, it is assumed that malware-writers and attackers tend to use more recently registered domains for command-and-control. Older domains are often more reputable and trusted. By way of example, the WHOIS protocol can be used to query the registered entity responsible for a domain name. Given this information, destination domains that are new to an enterprise network can be targeted, with "new" in this context being determined as domains that were registered within a given temporal limitation (for example, within the past year). Additionally, one or more example embodiments of the invention can include determining the age of only those domains that are contacted by a set of highly suspicious hosts (for example, hosts that contacted a large number of new destinations).

As also noted herein, an aspect of the invention includes identifying the internal hosts that communicate with identified suspicious destinations. However, a challenge exists in that most network logs (including web proxy logs, DNS logs, etc.) only record the IP address of the source host, which can be dynamically assigned to different hosts at different time intervals, rather than the hostname. In addition, the recorded source host may not actually be the entity generating the network connections, because there can be proxy servers within the enterprise that route traffic on behalf of other client hosts. As such, at least one embodiment of the invention, as detailed above, includes normalizing log timestamps and mapping dynamic IP addresses to their corresponding hostname.

Additionally, in connection with the issue of proxy servers handling traffic on behalf of clients, at least one embodiment of the invention includes identifying dedicated hosts that are primarily operated by a single user. Such dedicated hosts can be identified, for example, by using Windows® authentication data logged by domain controllers.

Consequently, each of the generated alerts generated by one or more embodiments of the invention includes a {source, destination} pair. The destination is the new external site that was contacted, and the source is the internal host that made that connection. Generated alerts can also include, for example, contextual information pertaining to a connection. Such contextual information can include, for instance, the HTTP web referrer, the status code, the connection timestamps, and the destination's category and reputation score assigned by a web proxy.

Figure 3:
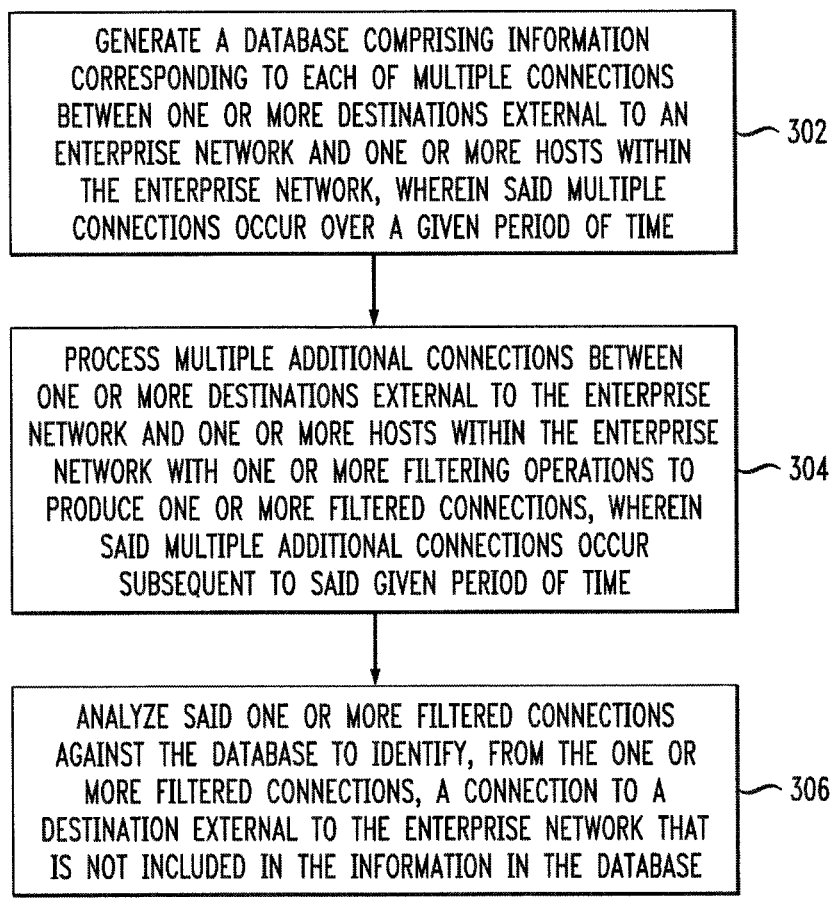
FIG. 3 is a flow diagram illustrating techniques according to an embodiment of the invention.

FIG. 3 is a flow diagram illustrating techniques according to an embodiment of the present invention. Step 302 includes generating a database comprising information corresponding to each of multiple connections between one or more destinations external to an enterprise network and one or more hosts within the enterprise network, wherein said multiple connections occur over a given period of time. At least one embodiment of the invention also includes updating the database with one or more additional connections per a given temporal frequency.

The one or more destinations can include, for example, a domain name and/or an internet protocol address. Additionally, the information in the database can include a timestamp corresponding to a respective connection between a destination external to the enterprise network and a host within the enterprise network. Also, at least one embodiment of the invention includes removing a given destination from the information in the database if the given destination has not been contacted by a host within the enterprise network over a specified duration of time.

Step 304 includes processing multiple additional connections between one or more destinations external to the enterprise network and one or more hosts within the enterprise network with one or more filtering operations to produce one or more filtered connections, wherein said multiple additional connections occur subsequent to said given period of time. Processing can include applying a white-list of one or more destinations to said multiple additional connections to preclude one or more of said multiple additional connections associated with said one or more destinations from said one or more filtered connections, wherein the white-list is customized with respect to the enterprise network. The white-list can include, for example, one or more destinations that are not in violation of an enterprise policy. Additionally, at least one embodiment of the invention includes identifying, from said multiple additional connections, a connection wherein a host contacted a destination without a white-listed referrer as one of said one or more filtered connections.

Processing can also include folding each of said one or more destinations to a second-level sub-domain to filter one or more services employing a random string as a sub-domain, wherein said one or more services correspond to one or more of said multiple additional connections. Further, in at least one embodiment of the invention, processing can additionally include identifying each of said multiple additional connections associated with a user bookmark to preclude from said one or more filtered connections, identifying each of said multiple additional connections associated with an unmodified internet protocol address to preclude form said one or more filtered connections, as well as determining the domain age of each of one or more destinations external to the enterprise network.

As detailed herein, processing can also include normalizing log data associated with said multiple additional connections. Additionally, normalizing can include normalizing a timestamp associated with each item of said log data into a common time zone, as well as establishing a mapping between each internet protocol (IP) address associated with said log data and a unique identifier for each of said one or more hosts.

Step 306 includes analyzing said one or more filtered connections against the database to identify, from the one or more filtered connections, a connection to a destination external to the enterprise network that is not included in the information in the database.

Figure 4:
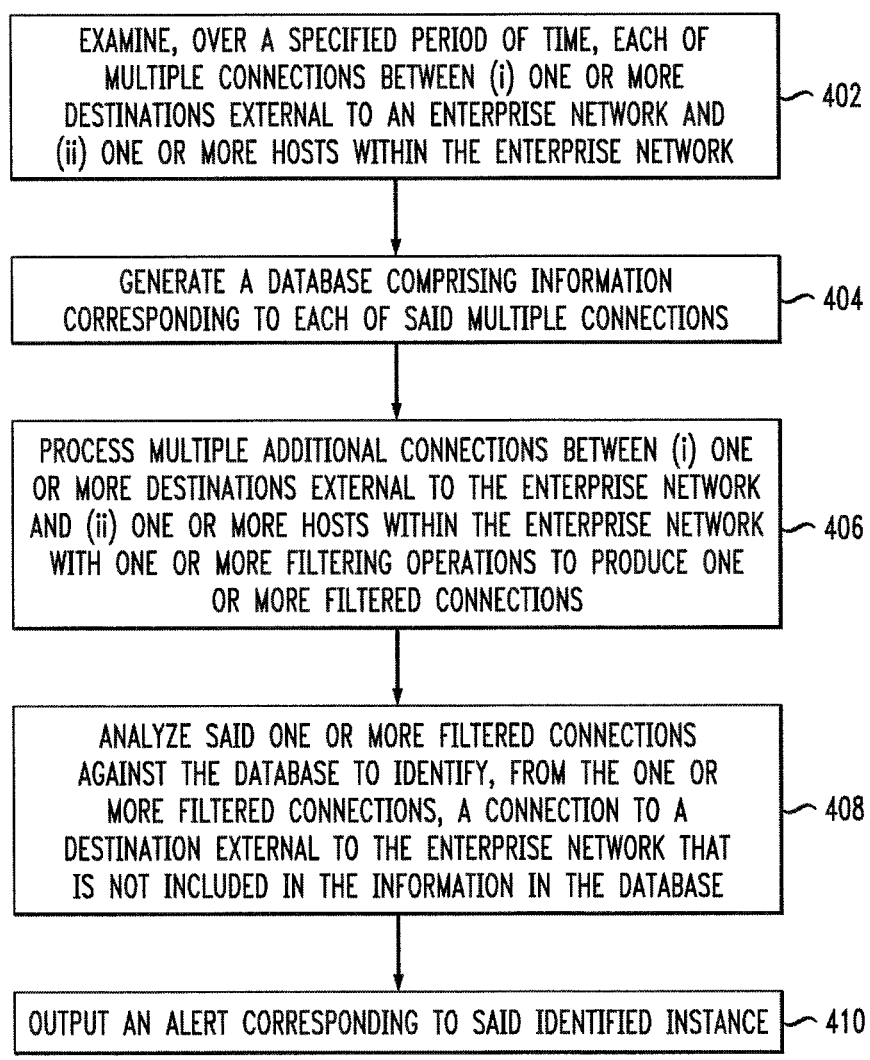
FIG. 4 is a flow diagram illustrating techniques according to an embodiment of the invention.

FIG. 4 is a flow diagram illustrating techniques according to an embodiment of the present invention. Step 402 includes examining, over a specified period of time, each of multiple connections between (i) one or more destinations external to an enterprise network and (ii) one or more hosts within the enterprise network. Step 404 includes generating a database comprising information corresponding to each of said multiple connections. Step 406 includes processing multiple additional connections between (i) one or more destinations external to the enterprise network and (ii) one or more hosts within the enterprise network with one or more filtering operations to produce one or more filtered connections.

Step 408 includes analyzing said one or more filtered connections against the database to identify, from the one or more filtered connections, a connection to a destination external to the enterprise network that is not included in the information in the database. Step 410 includes outputting an alert corresponding to said identified instance.

Additionally, the techniques depicted in FIG. 4 can also include updating the database with one or more additional connections per a given temporal frequency.

Figure 5:
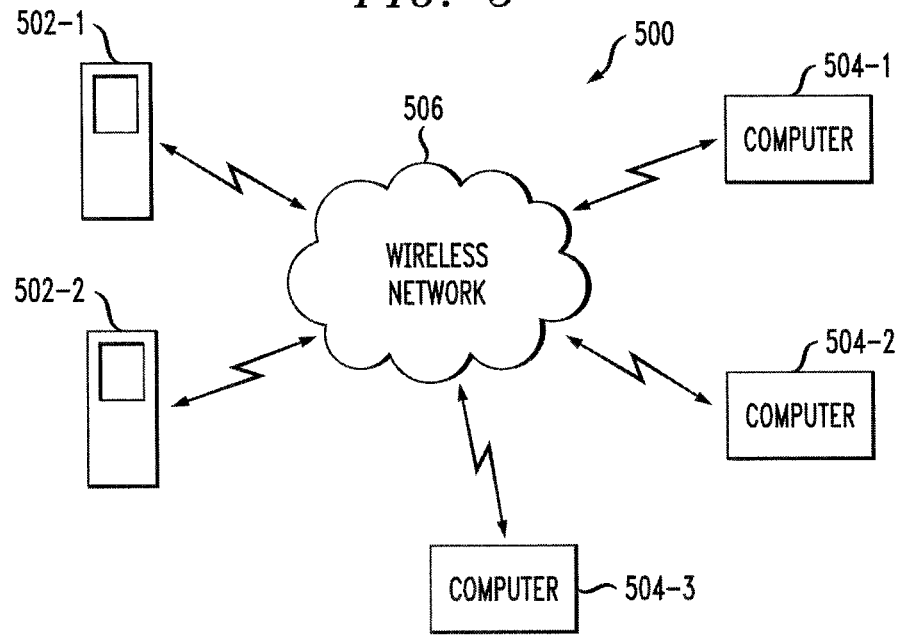
FIG. 5 shows an exemplary embodiment of a communication system that may incorporate the functionality of the type illustrated in at least one embodiment of the invention.

Suspicious web traffic detection techniques of the type described herein may be implemented in a wide variety of different applications. One exemplary communication system applications that may incorporate such techniques will now be described with reference to FIG. 5. Accordingly, FIG. 5 depicts a communication system 500 comprising a plurality of mobile telephones 502-1 and 502-2 and computers 504-1, 504-2 and 504-3, configured to communicate with one another over a network 506. For instances, such mobile telephones (for example, smart phones) and computers can be devices associated with employees and/or users within an enterprise network. It should be also be noted and appreciated that despite the limited number of devices illustrated in FIG. 5, the techniques described herein are scalable and, accordingly, can also be incorporated and/or implemented in connection with networks of much larger size.

Any two or more of the devices 502 and 504 may correspond to computing devices configured to implement at least one embodiment of the invention, as previously described. It is to be appreciated that the techniques disclosed herein can be implemented in numerous other applications.

Aspects of the present invention are described herein with reference to flowchart illustrations and/or block diagrams of methods, apparatus, systems and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function (s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each module embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 6:
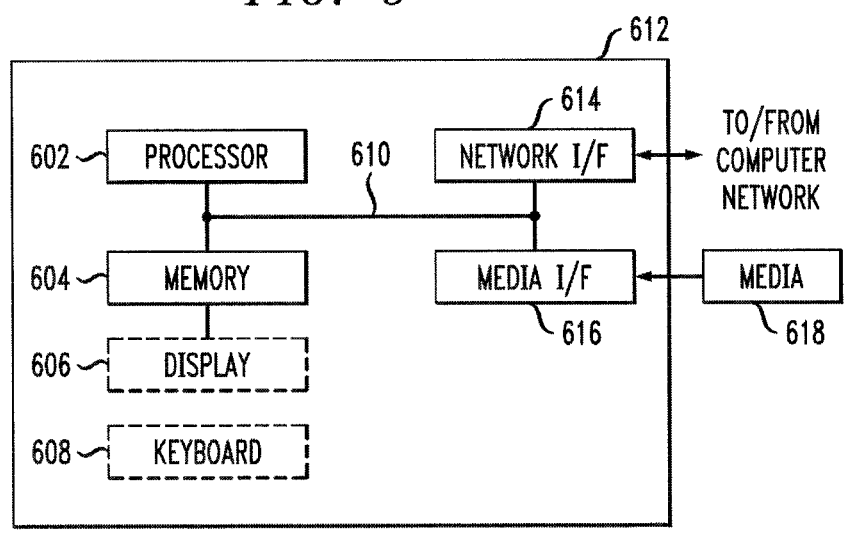
FIG. 6 is a system diagram of an exemplary computer system on which at least one embodiment of the invention can be implemented.

By way of example, an aspect of the present invention can make use of software running on a general purpose computer. As noted above, FIG. 6 is a system diagram of an exemplary computer system on which at least one embodiment of the invention can be implemented. As depicted in FIG. 6, an example implementation employs, for example, a processor 602, a memory 604, and an input/output interface formed, for example, by a display 606 and a keyboard 608. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 602, memory 604, and input/output interface such as display 606 and keyboard 608 can be interconnected, for example, via bus 610 as part of a data processing unit 612. Suitable interconnections via bus 610, can also be provided to a network interface 614 (such as a network card), which can be provided to interface with a computer network, and to a media interface 616 (such as a diskette or compact disc read-only memory (CD-ROM) drive), which can be provided to interface with media 618.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 608, displays 606, and pointing devices, can be coupled to the system either directly (such as via bus 610) or through intervening 110 controllers.

Network adapters such as network interface 614 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 612 as depicted in FIG. 6) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electro-magnetic, optical, or a suitable combination thereof. More generally, a computer readable signal medium is any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a LAN or a WAN, or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems and computing devices that can benefit from suspicious web traffic detection techniques. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
    generating a database comprising information corresponding to each of multiple connections between one or more destinations external to an enterprise network and one or more hosts within the enterprise network, wherein said multiple connections occur over a given period of time;
    processing multiple additional connections between one or more destinations external to the enterprise network and one or more hosts within the enterprise network with one or more filtering operations to produce one or more filtered connections, wherein said multiple additional connections occur subsequent to said given period of time, and wherein said processing comprises:
- applying a white-list of one or more destinations to said multiple additional connections to preclude one or more of said multiple additional connections associated with said one or more destinations from said one or more filtered connections, wherein said white-list is customized with respect to the enterprise network; and
- identifying, from said multiple additional connections, a connection wherein a host within the enterprise network contacted a destination without a white-listed referrer as one of said one or more filtered connections;

analyzing said one or more filtered connections against the database to identify, from the one or more filtered connections, a connection to a destination external to the enterprise network that is not included in the information in the database; and removing a given destination from the information in the database if the given destination has not been contacted by a host within the enterprise network over a specified duration of time;

wherein at least one of said generating, said processing, said analyzing, and said removing is carried out by a computing device.

2. The method of claim 1, wherein each of said one or more destinations comprises a domain name.

3. The method of claim 1, wherein each of said one or more destinations comprises an interne protocol address.

4. The method of claim 1, further comprising:
updating the database with one or more additional connections per a given temporal frequency.

5. The method of claim 1, wherein the information in the database comprises a timestamp corresponding to a respective connection between a destination external to the enterprise network and a host within the enterprise network.

6. The method of claim 1, wherein said white-list comprises one or more destinations that are not in violation of an enterprise policy.

7. The method of claim 1, wherein said processing comprises folding each of said one or more destinations to a second-level sub-domain to filter one or more services employing a random string as a sub-domain, wherein said one or more services correspond to one or more of said multiple additional connections.

8. The method of claim 1, wherein said processing comprises identifying each of said multiple additional connections associated with a user bookmark to preclude from said one or more filtered connections.

9. The method of claim 1, wherein said processing comprises identifying each of said multiple additional connections associated with an unmodified internet protocol address to preclude form said one or more filtered connections.

10. The method of claim 1, wherein said processing comprises determining a domain age of each of said one or more destinations external to the enterprise network.

11. The method of claim 1, wherein said processing comprises normalizing log data associated with said multiple additional connections.

12. The method of claim 11, wherein said normalizing comprises normalizing a timestamp associated with each item of said log data into a common time zone.

13. The method of claim 11, wherein said normalizing comprises establishing a mapping between each internet protocol (IP) address associated with said log data and a unique identifier for each of said one or more hosts.

14. An article of manufacture comprising a processor-readable storage medium having processor-readable instructions tangibly embodied thereon which, when implemented, cause a processor to carry out the steps of:
generating a database comprising information corresponding to each of multiple connections between one or more destinations external to an enterprise network and one or more hosts within the enterprise network, wherein said multiple connections occur over a given period of time;

processing multiple additional connections between one or more destinations external to the enterprise network and one or more hosts within the enterprise network with one or more filtering operations to produce one or more filtered connections, wherein said multiple additional connections occur subsequent to said given period of time, and wherein said processing comprises:
- applying a white-list of one or more destinations to said multiple additional connections to preclude one or more of said multiple additional connections associated with said one or more destinations from said one or more filtered connections, wherein said white-list is customized with respect to the enterprise network; and
- identifying, from said multiple additional connections, a connection wherein a host within the enterprise network contacted a destination without a white-listed referrer as one of said one or more filtered connections;

analyzing said one or more filtered connections against the database to identify, from the one or more filtered connections, a connection to a destination external to the enterprise network that is not included in the information in the database; and removing a given destination from the information in the database if the given destination has not been contacted by a host within the enterprise network over a specified duration of time.

15. An apparatus comprising:
a memory; and
at least one processor coupled to the memory; and
a plurality of modules executing on the at least one processor, wherein the plurality of modules comprise:
- a data module configured to generate a database comprising information corresponding to each of multiple connections between one or more destinations external to an enterprise network and one or more hosts within the enterprise network, wherein said multiple connections occur over a given period of time;
- a normalization module configured to process multiple additional connections between one or more destinations external to the enterprise network and one or more hosts within the enterprise network with one or more filtering operations to produce one or more filtered connections, wherein said multiple additional connections occur subsequent to said given period of time, and wherein said processing comprises:
  - applying a white-list of one or more destinations to said multiple additional connections to preclude one or more of said multiple additional connections associated with said one or more destinations from said one or more filtered connections, wherein said white-list is customized with respect to the enterprise network; and identifying, from said multiple additional connections, a connection wherein a host within the enterprise network contacted a destination without a white-listed referrer as one of said one or more filtered connections;
an analysis module configured to analyze said one or more filtered connections against the database to identify, from the one or more filtered connections, a connection to a destination external to the enterprise network that is not included in the information in the database; and
a module configured to remove a given destination from the information in the database if the given destination has not been contacted by a host within the enterprise network over a specified duration of time.

* * * * *